United States Patent [19]

Heilbron et al.

[11] Patent Number: 5,299,466
[45] Date of Patent: Apr. 5, 1994

[54] BRAKE LEVER EXTENSION

[75] Inventors: Jacob H. Heilbron, North Vancouver; Daniel K. Gerhard, Vancouver, both of Canada

[73] Assignee: Kona U.S.A., Inc., Blaine, Wash.

[21] Appl. No.: 927,840

[22] Filed: Aug. 10, 1992

[51] Int. Cl.$^5$ .............................................. B62K 23/06
[52] U.S. Cl. ........................................ 74/502.2; 74/488; 74/551.8
[58] Field of Search .................. 74/502.2, 523, 524, 74/525, 551.1, 551.4, 551.8, 551.9, 488, 489

[56] References Cited

U.S. PATENT DOCUMENTS

| | | | |
|---|---|---|---|
| 1,319,418 | 10/1919 | Reed | 74/544 |
| 3,507,259 | 4/1970 | Lankford | 74/489 |
| 3,719,104 | 3/1973 | Dian | 74/489 |
| 3,760,648 | 9/1973 | Hoffman | 74/489 |
| 3,803,937 | 4/1974 | Johnston | 74/489 |
| 3,835,724 | 9/1974 | Hoffman | 74/489 |
| 3,861,234 | 1/1975 | Cristie | 74/480 R |
| 3,905,242 | 9/1975 | Hoffman | 74/551.8 |
| 3,987,986 | 10/1976 | Shockley, Jr. | 244/83 F |
| 4,084,449 | 4/1978 | Kine | 74/480 R |
| 4,222,285 | 9/1980 | Kine | 74/525 |
| 4,276,675 | 7/1981 | Pioch | 16/111 R |
| 4,674,353 | 6/1987 | Yoshigai | 74/489 |
| 5,005,674 | 4/1991 | Piatt | 74/480 |
| 5,205,185 | 4/1993 | Herman | 74/551.1 |
| 5,224,396 | 7/1993 | Lobbezoo et al. | 74/551.8 X |
| 5,235,871 | 8/1993 | Yamazaki et al. | 74/551.9 X |

FOREIGN PATENT DOCUMENTS 2-237883  9/1990  Japan ................ 74/502.2

*Primary Examiner*—Leslie A. Braun
*Assistant Examiner*—Ryan W. Massey
*Attorney, Agent, or Firm*—Hughes & Multer

[57] ABSTRACT

An extension attachment for a bicycle brake lever. There is an eyebolt clamp which mounts the attachment to the end of the brake lever, and a lever member which extends generally perpendicularly from this so as to be parallel to a handlebar extension. This enables the rider to operate the brake lever without having to remove his hand from the extension bar.

16 Claims, 3 Drawing Sheets

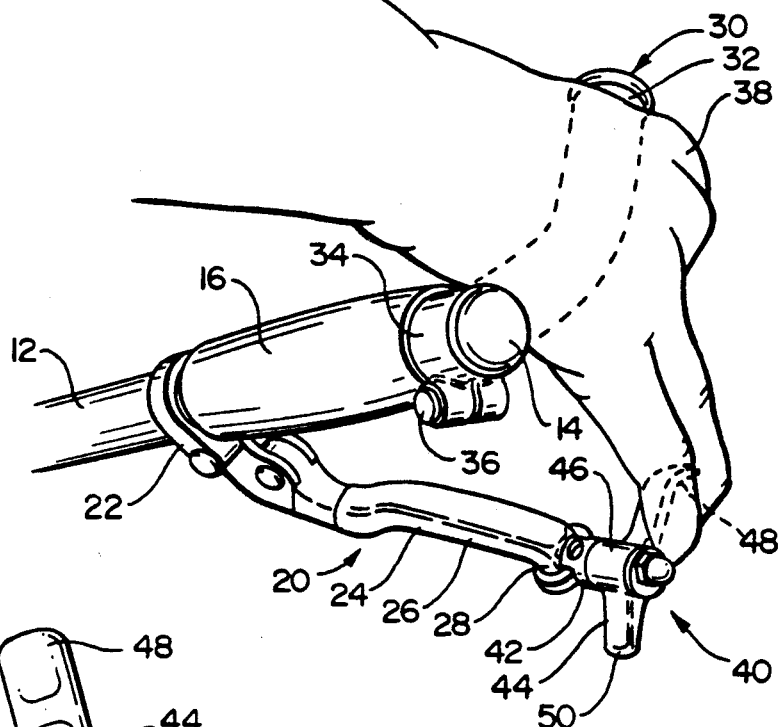
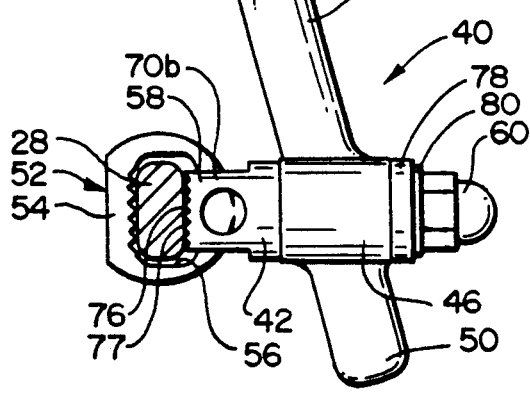
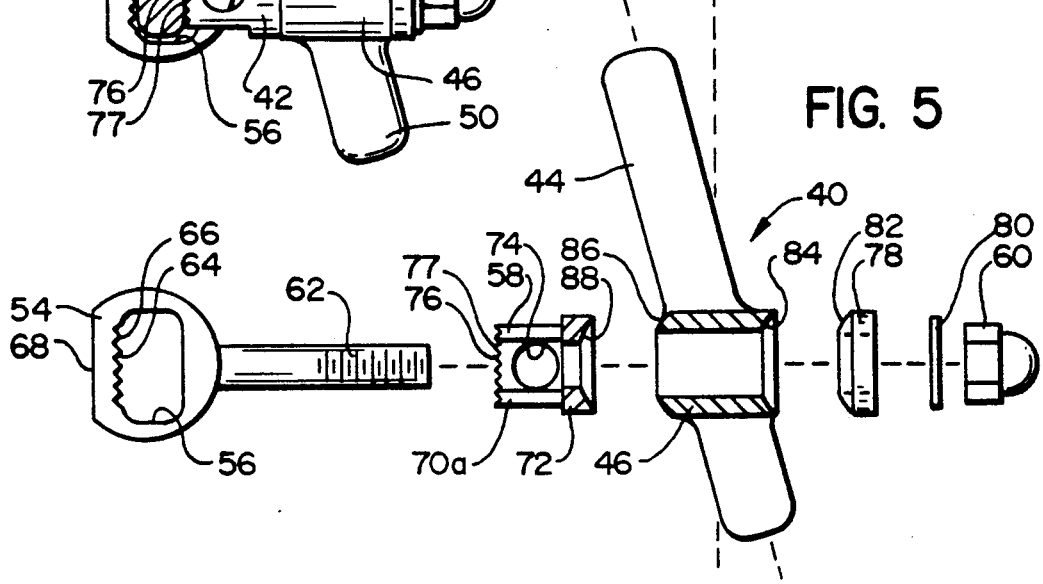

BRAKE LEVER EXTENSION

FIELD OF THE INVENTION

The present invention relates generally to vehicle brake systems, and, more particularly, to an extension for the handlebar brake lever of a bicycle which permits the rider to operate this when the rider's hand is gripping a handlebar extension.

BACKGROUND OF THE INVENTION

Bicycle brakes are typically operated by means of handlebar levers. The handlebars themselves are often configured to be gripped by the rider in two positions: in the first, "down" position, the rider is typically leaned forward into a position from which he can apply greater force to the pedals of the bicycle, and in the second position the rider is more upright for relatively relaxed cruising. In the case of all-terrain "mountain bikes", a straight, generally horizontally extending primary handlebar portion provides the "down" position, while there are secondary bar members which extend upwardly from the main handlebar at more-or-less right angles, and these can be gripped by the rider in the upright position. However, when the rider's hands are positioned on the upright secondary bars, it is very difficult or impossible for the rider to operate the brake levers without having to move his hands back to the horizontal bar section; obviously, this presents serious problems in terms of reaction times and maintaining control in emergency braking situations. To complicate matters, the secondary bar members are typically pivotable on the handlebar to provide a range of riding positions, and so the angular position of the rider's hands on the secondary bars may vary considerably with respect to the relatively fixed position of the brake levers.

Accordingly, there exists a need for an apparatus to permit a rider to quickly and conveniently operate the brake levers of a bicycle while the rider's hands are positioned on such upright secondary bars. Furthermore, there exists a need for such an apparatus which can be adjusted to compensate for angular adjustment of the position of the secondary bar members with respect to the primary handlebar.

SUMMARY OF THE INVENTION

The present invention has solved the problems cited above, and is an extension attachment for a bicycle brake lever. The extension attachment comprises a lever member which is configured to be gripped by the fingers of a rider's hand, and means for mounting this to an outer end of the brake lever so that the lever member extends at an angle to the brake lever and generally parallel to the secondary handlebar member, so as to permit the fingers of the rider's hand to reach this and actuate the brakes without having to release the grip on the secondary handlebar member.

The means for mounting the lever member to the brake lever may be a clamp which is configured to releasably engage an outwardly-bent tang portion on the outer end of the brake lever. This clamp may comprise first and second jaw portions for engaging the surfaces of the tang portion, with means being provided for selectively forcing the jaw portions into frictional engagement with these surfaces.

The first jaw portion may comprise an eyebolt having a ring opening at a first end thereof for receiving the tang portion of the brake lever, and a threaded shaft extending outwardly from this through a central portion of the lever member. The second jaw portion may be provided by a barrel member which is positioned about this shaft intermediate the ring opening and the lever member, with the barrel member having an inner surface which is configured to engage the outer surface of the lever tang. The means for forcing these jaw portions into engagement with the brake lever may be a nut member threaded onto the outer end of the shaft, so that as this is tightened, this presses the lever member against the barrel member so that the engagement surface of barrel member is forced towards that on the ring opening.

The central portion of the lever member may be a sleeve portion which is selectively rotatable about the threaded shaft, so as to permit adjustment of the lever member to a plurality of angular positions. This permits the lever member to be positioned parallel to the secondary handlebar member as the latter is similarly adjusted to a plurality of angular positions on the primary handlebar. The sleeve portion may be configured so that the lever member is lockable in a selected angular position in response to selective tightening of the nut member.

In a second embodiment, the means for mounting the extension attachment to the brake member may be a bolt member which is configured to pass through a bore formed in the outwardly-bent tang portion of the brake lever.

BRIEF DESCRIPTION OF THE DRAWINGS

FIG. 3 is a perspective view similar to that of FIG. 2, showing the manner in which the brake lever extension unit of the present invention permits the brake lever to be operated by the rider while the rider's hand is on the upright secondary bar;

FIG. 4 is a top plan view of the brake lever extension unit of FIGS. 2-3, this showing the manner in which this engages the outer end of the brake lever;

FIG. 5 is an exploded view of the brake lever extension unit of FIG. 4, showing the individual components thereof, and also the angle at which the bar member of the unit extends from the main axis thereof;

DETAILED DESCRIPTION

Figure 1:
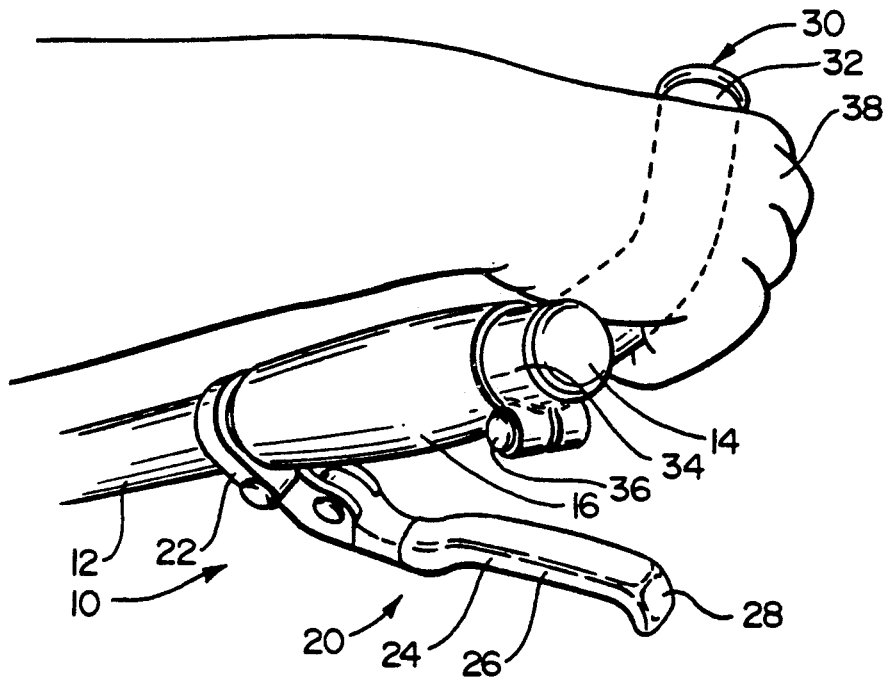
FIG. 1 is a perspective view of an end portion of a horizontal handlebar having an upright extension mounted to this, and showing how it is difficult or impossible for the rider's hands to reach the brake levers when holding the upright secondary bar members.

FIG. 1 shows a conventional handlebar arrangement 10 of the type described above, this now coming into use for "mountain" bikes. As can be seen, this is provided with a conventional, generally horizontally extending tubular main handlebar member 12 having an outer end 14, the right-hand end of the bar being shown in FIG. 1. A hand grip 16 is mounted near the outer end of the main handlebar member, and this is the position at which the rider's hand normally grips the assembly during vigorous pedaling. Accordingly, the brake lever 20 is positioned so as to be operable when the rider's hands are in this position. This is mounted to the main handlebar member by a clamp portion 22, and, as is conventional, the hinged lever 24 extends from this in a direction somewhat parallel to grip 16. As is also conventional, the lever 24 has a central portion 26 which is indented toward grip 16 so as to enhance the grip which is offered thereby, and the outer end of this indented portion is bounded by an outwardly angled tang portion 28.

FIG. 1 also shows the secondary handlebar member or extension 30 which is mounted to the outer end of the main handlebar assembly so as to extend generally perpendicularly from this. The extension is made up of a short tubular bar portion 32, one end of this being mounted to the outer end 14 of the main handlebar member 12 by means of a clamp 34 and pinch bolt 36. As will be described in greater detail below, this arrangement permits angular adjustment of the position of the secondary handlebar member, by loosening pinch bolt 36 and rotating the clamp 34 about the outer end of the main handlebar member.

FIG. 1 shows the rider's hand 38 grasping the secondary handlebar member 30, as is done when the rider is in the more upright posture on the bicycle. It will be observed that it is virtually impossible for the rider to extend his hand from this position to operate brake lever 20, being that it would be necessary for the wrist and hand to bend downwardly in front of the grip in order to do this; instead, the rider must return his hand to grip 16 and then squeeze lever 24 against this in order to operate the brake, and this is obviously undesirable from the standpoint of both reaction time and control in an emergency situation.

Figure 2:
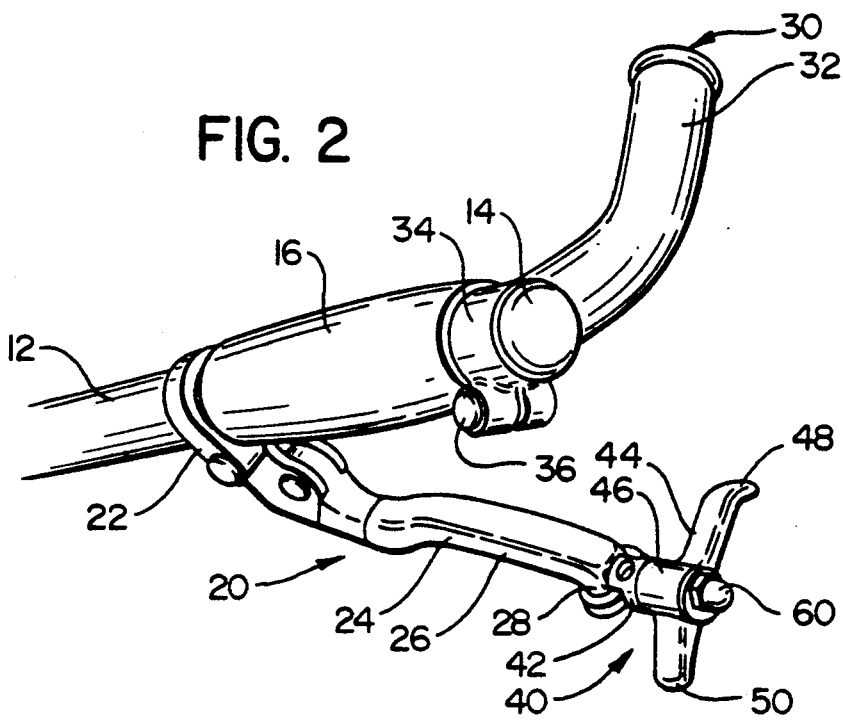
FIG. 2 is a perspective view similar to that of FIG. 1, this showing the adjustable brake lever extension unit of the present invention mounted on the end of the brake lever.

FIGS. 2-3 illustrate how this problem is overcome by the brake lever extension of the present invention. FIG. 2 shows the extension unit 40 mounted to the outwardly bent tang portion 28 of the brake lever. This extension unit 40 is made up generally of a mounting member 42 which engages tang 28 and extends generally longitudinally from lever 24, and a lever member 44 which extends generally perpendicular to this. As can be seen in FIG. 2, lever member 44 has a central barrel portion 46 which is mounted to the clamp member, and forward and rearward arm portions 48, 50 which extend outwardly from this. The outer extremities of arm portions 48 and 50 are angled downwardly, away from the handlebar members; these are thus slightly "hooked" so as to make it easier for the rider to grasp the lever member and pull this, particularly with partially extended fingers.

FIG. 3 shows the manner in which the brake lever extension unit 40 thus permits the rider to operate the brake lever while maintaining his grip on the secondary handlebar member 30. As can be seen, the rider is readily able to reach the lever member 44 of the extension unit with his lower fingers, while the hand remains firmly on the extension bar 30. The rider's grip on the latter is maintained by the thumb and index and middle fingers, and so the rider is able to squeeze lever member 44 toward the secondary handlebar member so as to actuate brake lever 20. The safety of the rider is thus greatly enhanced by the brake lever extension unit of the present invention.

Having provided an overview of the brake lever extension of the present invention, its structure and operation will now be described in greater detail.

Turning then to FIG. 4, this shows the manner in which the unit attaches to the end of the brake lever. As noted above, the extension unit 40 is provided with a mounting member 42 which clamps the unit to the handlebar lever. This mounting member is provided with a clamp portion 52 on its inner end for engaging the tang portion 28 of the brake lever, and this is made up a first, ring-shaped jaw member 54 which defines a receiving area 56 for tang 28, and a second jaw member 58 which is arranged in opposition to the first jaw member. As will be described below, the first jaw member 54 is part of an eyebolt, and so this is mounted to a threaded shaft which extends through the second jaw member and through the central portion 46 of lever member 44, with a nut member 60 being threaded on an outer end of this. Thus, to mount the extension unit to the handlebar lever, the tang portion 28 of the lever is inserted into the receiving area 56 and then nut member 60 is tightened to draw jaw member 54 toward jaw member 58, until the tang 28 is firmly gripped between these. The lever member 44, in turn, is gripped between the second jaw member 58 and nut 60, and so the entire unit is firmly attached to the brake lever, with the forward and rearward arm portions 48, 50 of the lever member extending outwardly from this for actuation by the rider's fingers.

FIG. 5 is an exploded view of extension unit 40, this showing additional details of the individual components of the assembly, and their functional relationship. As noted above, the circular primary jaw member 54 is mounted on one end of the threaded shaft 62 of the eyebolt, and this defines a receiving area 56; in the embodiment which is illustrated, receiving area 56 is generally rectangular so as to correspond generally to the cross section of commonly encountered brake levers. The engagement face 64 formed within this receiving area, opposite shaft 62, is preferably provided with serrations 66 to enhance the engagement of the clamp with the brake lever. Also, as is shown in FIG. 5, the outer end of the ring portion of the eyebolt has a flattened face 68 which extends generally parallel to the engagement face 64, which configuration minimizes the distance which this intrudes into the indented central portion of the brake lever which is intended to receive the rider's hand.

Figure 8:
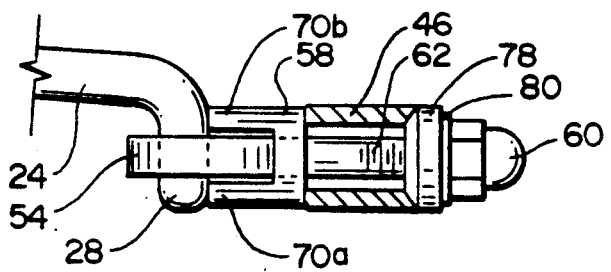
FIG. 8 is an end view of the extension unit of FIGS. 2-6, this being partly in cross section and showing the manner in which this is mounted by clamping to the outwardly-bent tang of a conventional brake lever.

Threaded shaft 62 extends through secondary jaw member 58, and, as can be seen, this is a cylindrical barrel which is slotted to form a yoke which fits over the ring-shaped primary jaw member. Accordingly, there are first and second legs 70a, 70b (see also FIG. 4) which extend past the sides of the ring and into the receiving area thereof, and a cylindrical collar portion 72 which interconnects these; this arrangement is also clearly shown in FIG. 8. The legs 70a, 70b are pierced by perforations 74 so as to relieve these of excess material and weight, and the ends of the leg portions form engagement faces 76 which are spaced symmetrically with respect to the first engagement face 64. Preferably, engagement faces 64 are provided with serrations 77 to improve their grip on the brake lever.

From jaw member 58, shaft 62 extends through the central barrel portion of the lever member 44, and, as seen in FIG. 5, this is a generally cylindrical sleeve from which the forward and rearward arm portions of the lever member extend. The outer end of shaft 62 protrudes beyond this, passes through a tapered bushing 78 and flat washer 80, and is engaged by nut member 60.

The inner end of bushing 78 is provided with a spherically tapered bearing surface 82, and this engages a correspondingly tapered mouth opening 84. The inner end of the central barrel of the lever member, in turn, is similarly provided with a spherically tapered bearing surface 86 which engages a correspondingly tapered mouth opening 88 in the collar of secondary jaw member 58. This arrangement serves several purposes. Firstly, it provides for a smoother and more positive angular adjustment of the lever member by rotating this about shaft 62 when nut 60 is loosened, as will be described below with reference to FIG. 6, and it helps ensure proper assembly of these components. Furthermore, this arrangement permits adjustment of the angle at which the lever member extends from the axis of shaft 62, by "rocking" of the lever member one way or the other, as will be described below with reference to FIG. 7.

Figure 6:
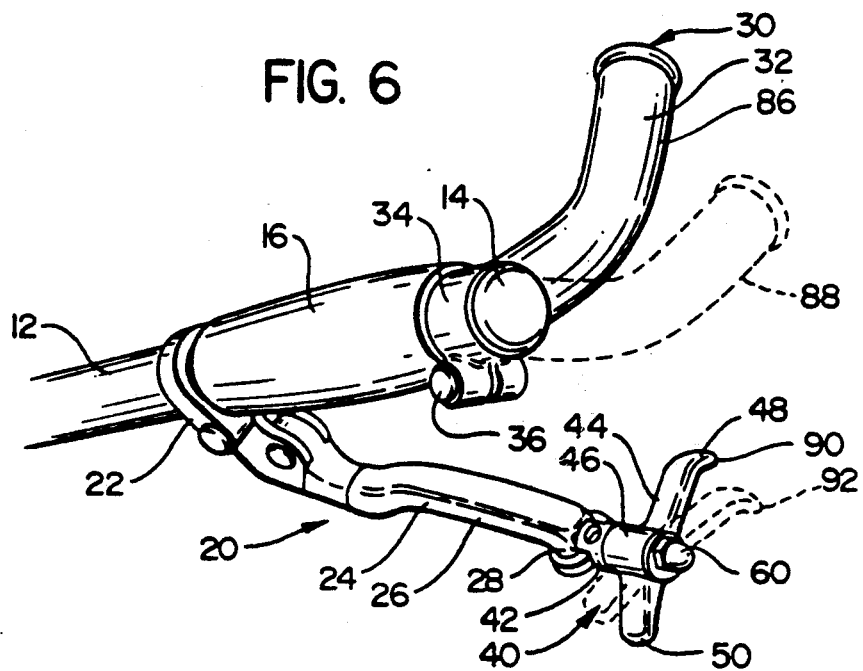
FIG. 6 is a perspective view similar to FIGS. 2-3, showing the manner in which the angular orientation of the extension unit is adjustable to match that of the handlebar extensions.
Figure 7:
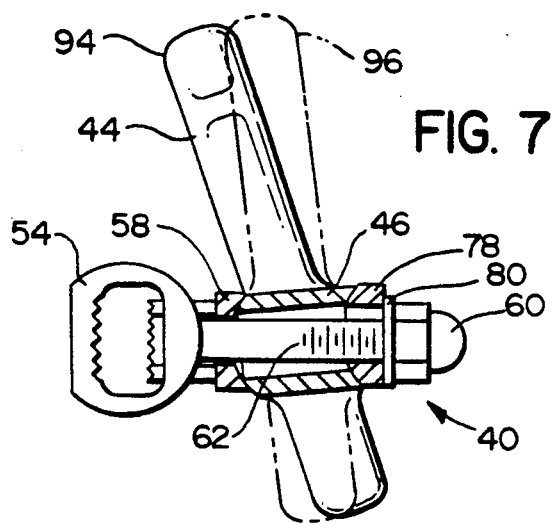
FIG. 7 is a top plan view, partly in cross section, of the extension unit of FIGS. 2-6, showing adjustment of the angle at which the lever member extends relative to the axis of the central mounting bolt.

FIGS. 6-7 illustrate the several adjustments which are available with the extension unit of the present invention. In particular, FIG. 6 illustrates the manner in which the lever member 44 of the unit is adjustable about the horizontal axis so as to be generally parallel to the secondary handlebar member. As was noted above, the handlebar extension 30 can be rotated about the outer end of the main handlebar by slackening pinch bolt 36 and rotating clamp 34. Thus, FIG. 6 shows the secondary handlebar member 30 having been rotated from the first angular position indicated at 86, to a second angular position at broken line image 88 (this being somewhat exaggerated here for purposes of illustration). In order for the lever member 44 to be conveniently operated by the rider from the secondary handlebar member, the lever member should extend generally parallel to this; accordingly, FIG. 6 shows the lever member 44 having been adjusted from the position indicated at 90 to that indicated at broken line image at 92. This is very conveniently accomplished by slackening nut member 60 so as to release the tapered bearing surfaces of the assembly from frictional engagement from one another, rotating the lever member about the axis of the central shaft 62 to the desired position, and then tightening the nut member again.

FIG. 7, in turn, shows the adjustment of the angle at which the lever member extends from the central shaft of the assembly; in other words, the adjustment of this about the generally vertical axis of the assembly. As noted above, this is made possible by the spherical mating surfaces on the bushing 78, lever member 44, and secondary jaw member 58: as can be seen in FIG. 7, a relationship analogous to a ball-and-socket joint is formed at the interface of these surfaces. Thus, when the nut member 60 is slackened, these surfaces are released from locking frictional engagement, and then the central barrel portion 46 of the lever member can be pivoted back and forth between bushing 78 and jaw member 58 in a "rocking" motion, with the curved bearing surfaces sliding over one another. The inside diameter of the sleeve portion of the lever member is sized significantly larger than the diameter of the threaded shaft 62, and this permits the ends of the sleeve to move towards and away from the shaft as necessary when the lever is pivoted back and forth; similarly, the inside diameter of bushing 78 is also sized larger than the diameter of shaft 62, and this permits the bushing to shift laterally with respect to the shaft in order to accommodate the movement of the end of the lever barrel. Thus, the position of the lever member can be adjusted from a first angular position 94 relative to the axis of shaft 62, to a second angular position, as indicated by broken line image 96; for many applications, this adjustment may center around an angle (as indicated by the symbol $\theta$ in FIG. 5) of about 15° toward the centerline of the bicycle, so that when the extension unit is mounted on the brake lever, the lever member extends generally parallel to the vertical plane of the handlebar extension. The nut 60 can then be tightened again to lock the lever member in the selected angular position.

Figure 9:
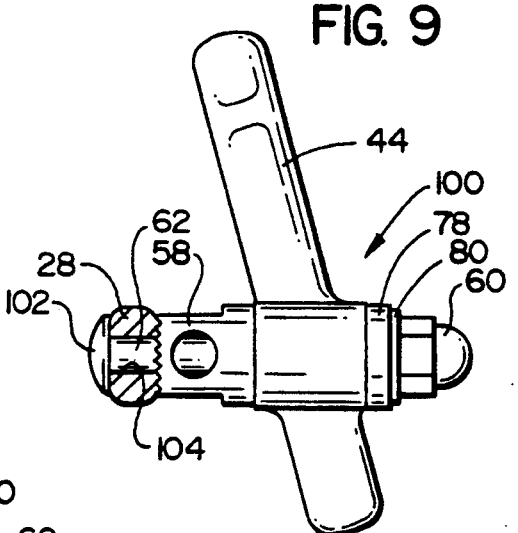
FIG. 9 is a plan view of a second embodiment of extension unit in accordance with the present invention, this being mountable to the brake lever by means of a bolt which passes through a hole in the end of the lever.

FIG. 9 shows a second embodiment of extension unit in accordance with the present invention, this differing from the embodiment described above in the manner of mounting to the tang portion of the brake lever. This second unit 100 is otherwise substantially identical to that described above, and so like reference numerals will refer to like elements with respect to this Figure. In this embodiment, the ring shaped primary jaw portion has been replaced by a bolt head 102, this being mounted to the end of the threaded central shaft 62; in essence, in this embodiment the central shaft and primary jaw may be provided by a conventional carriage-type bolt, rather than the eyebolt described above. In this case, shaft 62 is configured to extend through a bore 104 which has been drilled in the tang portion 28 of the brake lever for installation of the extension unit. The shoulders of bolt head 98 extend beyond the bore to engage one side of tang 28, and the other side is engaged by the secondary jaw member 58. Then, when nut member 60 is tightened, the tang portion of the lever is firmly clamped between the bolt head and secondary jaw 58.

It is to be recognized that many modifications may be made to the illustrative embodiments described herein without departing from the spirit and scope of the present invention. Accordingly, the invention is not to be limited except as by the appended claims.

What is claimed is:

1. An extension attachment for a bicycle brake lever, said brake lever extending generally parallel and adjacent to a grip portion of a primary handlebar member, and said primary handlebar member having a secondary handlebar member mounted thereto so as to extend at an angle to said grip portion, said extension attachment comprising: a lever member having a relatively straight operating portion which extends generally along a single axis and which is configured to be gripped by the fingers of a rider's hand; and means for mounting said lever member to an outer end of said brake lever so that said axis of said operating portion extends transversely across said outer end of said lever, and so that said operating portion of said lever member extends generally perpendicularly from said end of said brake lever and generally parallel to said secondary handlebar member, so as to permit said fingers of said hand to reach said operating portion of lever member to actuate said brake lever without said hand having to release a grip on said secondary handlebar member.

2. The extension attachment of claim 1, wherein said means for mounting said lever member to said brake lever comprises a clamp member configured to releasably engage an outwardly bent tang portion on said outer end of said brake lever.

3. The extension attachment of claim 2, wherein said clamp member comprises:
- a first jaw portion configured to engage an inner surface of said tang portion of said lever;
- a second jaw portion configured to engage an outer surface of said tang portion; and
- means for selectively forcing said first and second jaw portions into frictional engagement with said surfaces of said tang portion.

4. The extension attachment of claim 3, wherein said first jaw portion comprises:
- an eyebolt having a ring portion at a first end for receiving said tang portion of said brake lever; and
- a threaded shaft extending outwardly from said ring portion through said lever member of said attachment.

5. The extension attachment of claim 4, wherein said second jaw portion comprises a barrel member positioned about said shaft of said eyebolt intermediate said ring portion and said lever member, said barrel member having an inner surface configured to engage an outer surface of said tang portion of said brake lever.

6. The extension attachment of claim 5, wherein said means for forcing said jaw portions into engagement with said brake lever comprises a nut member in threaded engagement with an outer end of said shaft of said eyebolt, so that said engagement surface of said barrel member is forced toward said engagement surface of said ring portion by selective tightening of said nut member against an outer side of said lever member.

7. The extension attachment of claim 6, wherein said central portion of said lever member through which said shaft of said eyebolt passes comprises a sleeve portion of said lever member, said sleeve portion being selectively rotatable about said shaft so as to permit adjustment of said operating portion of sad lever member to a plurality of angular positions such that said operating portion remains parallel to said secondary handlebar member as said secondary handlebar member is similarly adjusted to a plurality of angular positions on said primary handlebar member.

8. The extension attachment of claim 7, wherein said lever member is configured so that said operating portion thereof is lockable in a selected sad angular position in response to selective tightening of said nut member.

9. The extension attachment of claim 1, wherein said means for mounting said attachment to said brake lever comprises a bolt member configured to pass through a bore formed in an outwardly angled tang portion on said end of said lever.

10. An extension attachment for a bicycle brake lever, said brake lever extending generally parallel and adjacent to a grip portion of a primary handlebar member, and said primary handlebar member having a secondary handlebar member mounted thereto so as to extend at an angle to said grip portion, said extension attachment comprising:
- a lever member configured to be gripped by the fingers of a rider's hand; and
- means for mounting said lever member to an outer end of said brake lever so that said lever member extends at an angle to said brake lever ad generally parallel to said secondary handlebar member, so as to permit said fingers of said hand to reach sad lever member to actuate said brake lever without said hand having to release a grip on said secondary handlebar member;
- said means for mounting said lever member to said brake lever comprising a clamp member configured to releasably engage an outwardly bent tang portion on said outer end of said brake lever and having:
  - a first jaw portion configured to engage an inner surface of said tang portion of said lever;
  - a second jaw portion configured to engage an outer surface of said tang portion; and
  - means for selectively forcing said first and second jaw portions into frictional engagement with said surface of sad tang portion.

11. The extension attachment of claim 10, wherein said first jaw portion comprises:
- an eyebolt having a ring portion at a first end for receiving said tang portion of said brake lever; and
- a threaded shaft extending outwardly from said ring portion through said lever member of said attachment.

12. The extension attachment of claim 11, wherein said second jaw portion comprises a barrel member positioned about said shaft of said eyebolt intermediate said ring portion and said lever member, said barrel member having an inner surface configured to engage an outer surface of said tang portion of said brake lever.

13. The extension attachment of claim 12, wherein said means for forcing said jaw portions into engagement with said brake lever comprises a nut member in threaded engagement with an outer end of said shaft of said eyebolt, so that said engagement surface of said barrel member is forced toward said engagement surface of said ring portion by selective tightening of said nut member against an outer side of said lever member.

14. The extension attachment of claim 13, wherein said central portion of said lever member through which said shaft of said eyebolt passes comprises a sleeve portion of said lever member, said sleeve portion being selectively rotatable about said shaft so as to permit adjustment of said lever member to a plurality of angular positions such that said lever member remains parallel to said secondary handlebar member as said secondary handlebar member is similarly adjusted to a plurality of angular positions on said primary handlebar member.

15. The extension attachment of claim 14, wherein said lever member is configured so that said lever member is lockable in a selected said angular position in response to selective tightening of said nut member.

16. An extension attachment for a bicycle brake lever, said brake lever extending generally parallel and adjacent to a grip portion of a primary handlebar member, and said primary handlebar member having a secondary handlebar member mounted thereto so as to extended at an angle to said grip portion, said extension attachment comprising:
- a lever member configured to be gripped by the fingers of a rider's hand; and
- means for mounting said lever member to an outer end of said brake lever so that said lever member extends at an angle to said brake lever and generally parallel to said secondary handlebar member, so as to permit said fingers of said hand to reach said lever member to actuate said brake lever without said hand having to release a grip on said secondary handlebar member;

said means for mounting said attachment to said brake lever comprising a bolt member configured to pass through a bore formed in an outwardly angled tang portion on said end of said lever.

* * * * *